G. W. GERLACH & L. EDWARDS.
TRANSMISSION MECHANISM.
APPLICATION FILED MAR. 24, 1911.

999,643.

Patented Aug. 1, 1911.

Witnesses

Inventors
G. W. Gerlach
L. Edwards

By

Attorneys.

COLUMBIA PLANOGRAPH CO., WASHINGTON, D. C.

UNITED STATES PATENT OFFICE.

GEORGE W. GERLACH AND LOUIS EDWARDS, OF CUMBERLAND, IOWA.

TRANSMISSION MECHANISM.

999,643.  Specification of Letters Patent.  Patented Aug. 1, 1911.

Application filed March 24, 1911. Serial No. 616,693.

*To all whom it may concern:*

Be it known that we, GEORGE W. GERLACH and LOUIS EDWARDS, citizens of the United States, residing at Cumberland, in the county of Cass and State of Iowa, have invented certain new and useful Improvements in Transmission Mechanism, of which the following is a specification.

This invention comprehends certain new and useful improvements in transmission mechanism and relates particularly to transmission gearing of the sliding gear type.

The invention has for its primary object a simple, durable and efficient construction of sliding gear transmission mechanism which will positively preclude the liability of stripping or otherwise injuring the gear teeth, which is an incident of the ordinary sliding transmission mechanism as heretofore constructed, rendering the same decidedly objectionable, particularly for use in automobile or similar work.

With this and other objects in view, our invention consists essentially in a sliding gear transmission mechanism in which each of the meshing members arranged to convey motion from the transmission shaft to the jack or driven shaft, is a twin gear, embodying two preferably integrally connected spaced parts joined by a solid or grooved hub, both of said parts being exactly of the same diameter and circumference with the same number of teeth that are exactly of the same size and in true alinement with each other, as regards the respective parts. And the invention also consists in certain constructions, arrangements and combinations of the parts that we shall hereinafter fully describe and claim.

Figure 1:
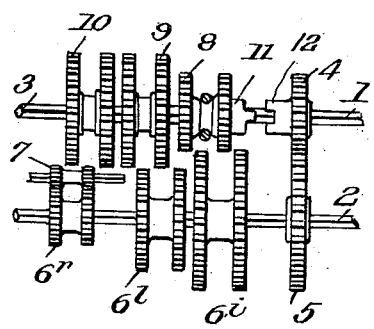
Figure 3:
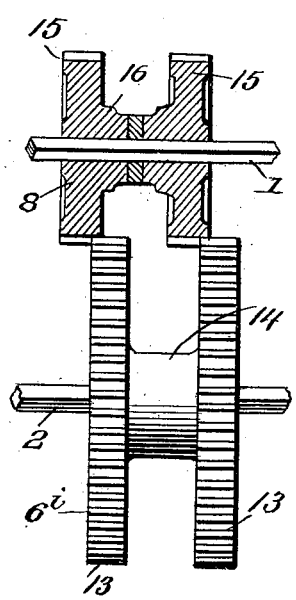
Figure 2:
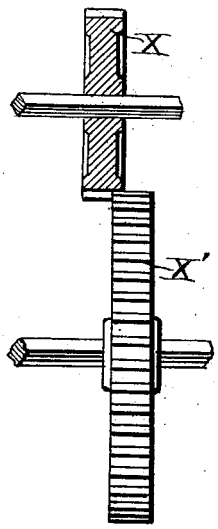

For a full understanding of the invention, reference is to be had to the following description and accompanying drawings, in which:

Figure 1 is an elevation of our improved gearing; and, Figs. 2 and 3 are detail sectional views in the nature of diagrams.

Corresponding and like parts are referred to in the following description and indicated in all the views of the drawings by the same reference characters.

Referring to the drawings, the numeral 1 designates a drive shaft leading from the internal combustion engine or other motor, 2 the transmission shaft, and 3 the driven shaft arranged in longitudinal alinement with the engine shaft 1 and parallel to the shaft 2. The shaft 1 carries a spur pinion 4 meshing with a spur gear wheel 5 on the forward end of the shaft 2. The shaft 2 carries three fast twin gear wheels designated, respectively, $6^i$, $6^l$ and $6^r$, all keyed or otherwise rigidly secured to the shaft and preferably of varying diameters. It will thus be understood that in the present embodiment of the invention, although the invention is not limited to this arrangement and proportion of parts, the mechanism is arranged for three speeds forward and one reverse, it being noted that the gear wheel $6^r$ meshes with a relatively small twin idler 7.

The shaft 3 carries three sliding twin gears 8, 9 and 10, of varying diameter relative to each other, the gear 8 being provided at its forward end with a clutch member 11 designed for engagement by a clutch member 12 carried by the shaft 1. Thus it will be understood that when the wheel 8 is slid forward to the limit of its movement, the clutch members 11 and 12 will interengage so as to directly couple the shaft 3 with the shaft 1 for high speed or direct drive. It will also be understood that the gear wheel 8 is intended to mesh with the gear wheel $6^i$ for intermediate speed; the gear wheel 9 is intended to mesh with the gear wheel $6^l$ for low speed, and the gear wheel 10 is intended to mesh with the idler 7 for the reverse.

It is to be particularly noted that each of the wheels $6^i$, $6^l$, $6^r$, 8, 9 and 10, are of twin formation. That is to say, taking the gear wheels $6^i$ and 8 as examples, the wheel $6^i$ carried by the transmission shaft 2 and keyed thereon, embodies two toothed parts 13 spaced a predetermined distance from each other, and joined, preferably integrally by a solid hub 14. Similarly, the gear wheel 8 embodies two toothed parts 15 joined integrally by a hub 16 intermediate the two, the hub being grooved or otherwise formed to receive a yoke or other shipper member. Manifestly, each of the two toothed parts of a wheel are exactly identical in number and size of teeth, preferably in width of teeth, and also in alinement of teeth and diameter and circumference.

For a fuller understanding of the advantages derived by our construction, reference is now to be had particularly to Figs. 2 and 3, in the former of which two gears X, X' are shown slidable into and out of engagement with each other, the two gear wheels being shown as just meshing. This, of course, is the time when the greatest strain is imposed on the wheels, in changing from, say, low speed to a high speed, as the torque or inertia must be overcome, and it is to be noted that only a very small portion of the engaging teeth mesh with each other, say, about one-sixteenth of an inch, which makes the teeth very liable to become worn, chipped or stripped, particularly after repeated operations, thereby impairing if not entirely destroying the efficiency of the automobile or the like which is equipped with the sliding gear transmission. In contradistinction to this, reference is to be had to Fig. 3, which shows two gear wheels embodying our improvements, just about to engage with each other; and it will be observed that with our construction, in view of the twin formation of the gears, at least a hundred per cent. gain will be effected in the resistance, for where a single gear on entering might mesh, say, only for one-sixteenth of an inch, in the same proportion and arrangement of parts, our improved gears would mesh one-eighth of an inch. Consequently, less strain is placed upon each tooth and liability of stripping, chipping or wearing proportionately reduced.

It is to be understood that our invention is not limited to any particular sliding or progressive method or mechanism for shifting the sliding gears and that various changes may be made in the construction, arrangement and proportions of the parts without departing from the scope of the invention as defined in the appended claims.

Having thus described the invention, what is claimed as new is:

1. A sliding gear transmission mechanism, embodying gear wheels, one of which is arranged to slide into and out of meshing engagement with the other in a plane axially of the gears, each of said gear wheels embodying corresponding spaced toothed portions and a connecting hub.

2. A sliding gear transmission mechanism, embodying gear wheels, one of which is arranged to slide into and out of meshing engagement with the other in a plane axially of the gears, each of said gear wheels embodying corresponding spaced toothed portions.

In testimony whereof, we affix our signatures in presence of two witnesses.

GEORGE W. GERLACH. [L. S.]
LOUIS EDWARDS. [L. S.]

Witnesses:
JOHN W. REED,
F. B. JONES.

Copies of this patent may be obtained for five cents each, by addressing the "Commissioner of Patents, Washington, D. C."